S. C. PANDOLFO.
AUTOMOBILE SEAT CONSTRUCTION.
APPLICATION FILED JAN. 29, 1918.
1,324,616. Patented Dec. 9, 1919.
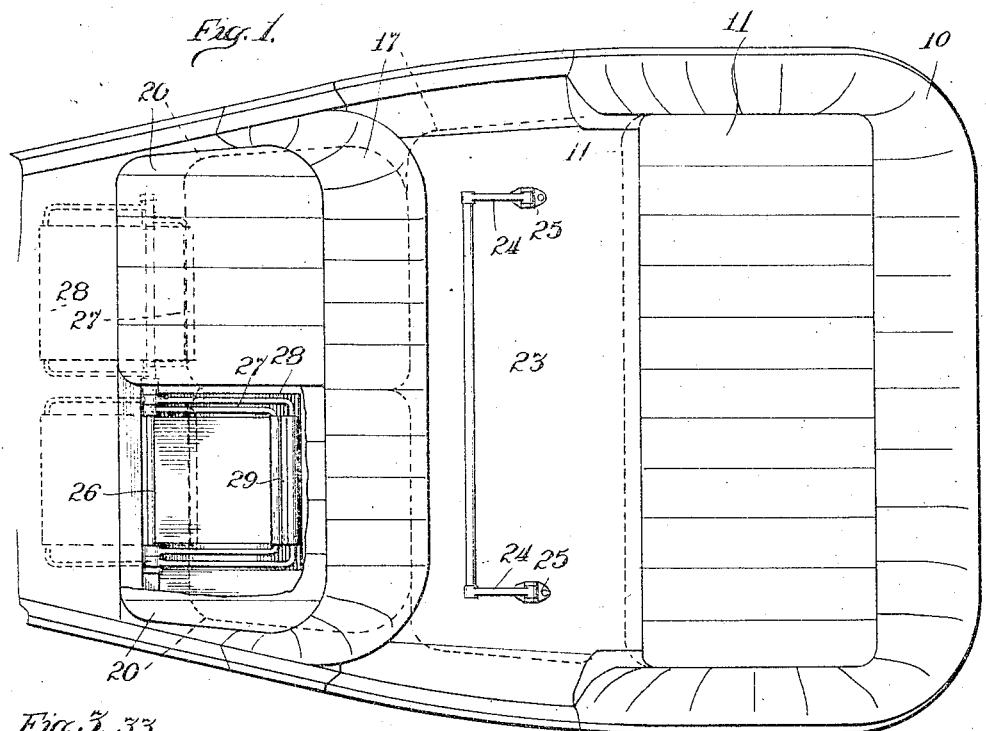
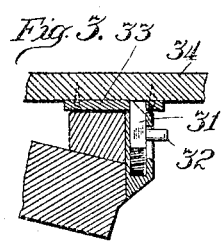
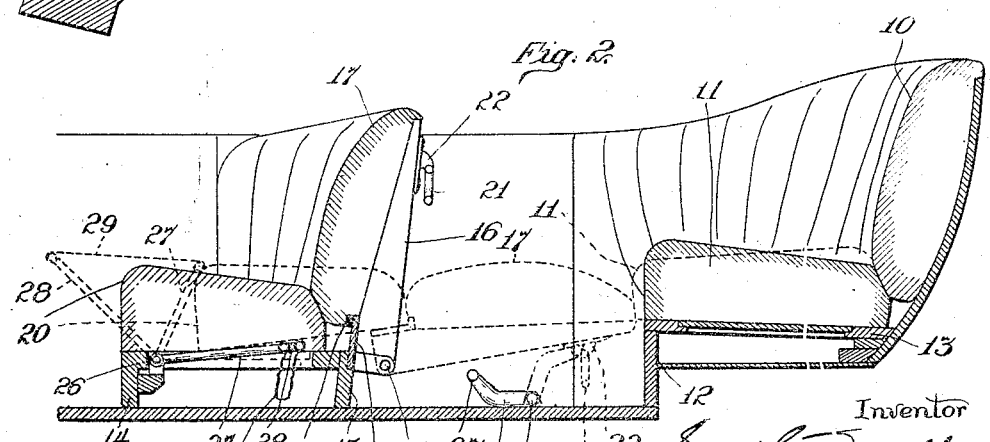
Witnesses
Inventor
Samuel C. Pandolfo

UNITED STATES PATENT OFFICE.

SAMUEL C. PANDOLFO, OF ST. CLOUD, MINNESOTA.

AUTOMOBILE-SEAT CONSTRUCTION.

1,324,616.  Specification of Letters Patent.  Patented Dec. 9, 1919.

Application filed January 29, 1918. Serial No. 314,332.

*To all whom it may concern:*

Be it known that I, SAMUEL C. PANDOLFO, a citizen of the United States, and a resident of St. Cloud, in the county of Stearns and State of Minnesota, have invented certain new and useful Improvements in Automobile-Seat Construction, of which the following is a description, reference being had to the accompanying drawing, which forms a part of my specification.

My invention relates more particularly to the construction of automobile seats, having for its object the provision of an adjustable seat and correlated parts, whereby the seat of an automobile, and more especially the front seat, may be so adjusted that the front-seat and correlated elements, in conjunction with the rear-seat, will constitute or form a couch.

The invention contemplates means whereby the front seat-back is pivotally mounted to permit it to be adjusted or swung into substantially horizontal position, together with mechanism whereby the seat in this adjusted position will be provided with a firm support, while certain other mechanism, freed by the adjustment of said seat, may be brought into a position whereby a couch of proper inclination and length, in conjunction with the cushions of the seat and the seat-back will be provided.

The invention contemplates a construction whereby the general appearance and normal arrangement of the seats and backs will in no way be affected or altered; while the usual "set-up" position of the seat-back will be maintained by suitable locking mechanism.

The construction and its advantages will be more fully understood and comprehended from the detailed description of the accompanying drawing, wherein:—

Figure 1 is a top plan view of a portion of an automobile body and the seats thereof; a portion of the front seat being broken away to more clearly disclose certain of the mechanism there-beneath.

Fig. 2 is a longitudinal sectional view, illustrating in dotted lines the adjusted positions of the seats and back and other correlated mechanisms.

Fig. 3 is a detail view, in section, of latching means whereby the front seat-back is maintained in its upright or normal position.

The object of my invention is to provide a construction whereby the seats of an automobile may be readily adjusted into couch-forming position and relation, with proper inclination and length, and thus adapt the automobile for touring purposes, whereby the occupant, or occupants, may recline and use the automobile to assume a reclining position.

The invention in its specific adaptation is illustrated in connection with a well known type of automobile body wherein the back of the rear seat, indicated at 10, is upholstered and cushioned in the usual manner and immobile; while the seat-portion thereof is shown in the nature of a continuous or long cushion which rests upon the supporting members or frame-portions 12 and 13 which are permanently secured in the body of the automobile or vehicle; the seat or cushion 11 being removable when desired. The cushion or seat 11 is usually made with an upward inclination toward the front edge thereof, as shown in full lines in Fig. 2.

The front seat of the automobile may consist of one or more cushions which are adapted to rest on the supporting members or framework 14 and 15 which extend transversely of the automobile-body and are permanently secured in place; the frame work or members 14 and 15 being usually provided at the top with laterally disposed portions adapted to provide an opening to the chamber formed beneath the seat; the opening usually receiving the panel secured on the bottom of the seat. The front seat-back comprises the frame-portion 16 which is upholstered in the usual manner, as shown at 17. The frame 16 is pivotally secured at the lower end, as shown at 18, to the sides of the automobile-body so as to permit the seat-back 16 to be swung downwardly into substantially horizontal position, as shown in dotted lines in Fig. 2. The forward side of the frame-portion and at the bottom is preferably provided with a panel, as at 19, which not only provides a suitable finish for the space beneath the upholstered portion 17, at a point beneath the top of the seat-portion or cushion, indicated at 20, but also provides a suitable supporting element or member for the cushion 20 when the seat has been put into couch-form as shown in dotted lines. The back or frame 16 may be provided with the usual construction of robe-rail 21, which extends transversely of the automobile body and is suspended from or supported by a number of brackets, one of which is shown at 22 in Fig. 2. The brackets are secured to the seat back 16 at a point in proximity to the top of the back as shown. As the brackets are intended to serve another purpose, I provide brackets having a downwardly curving lug or arm portion, see Fig. 2, so as to produce a socket or pocket intermediate of the free end of the lug and the attaching plate-portion of the bracket. The additional function of the brackets will be apparent from the following description.

The floor of the automobile, at a point intermediate of the rear seat and the front-seat is provided with a foot-rail 23 which comprises the rail proper extending transversely of the automobile body and the end-portions or arms 24 which are pivotally secured to suitable lugs 25, which, in turn, are preferably secured to the floor of the automobile. The arms 24 are so secured to the lugs that the foot-rail 23 may be swung upwardly toward the rear seat into the position shown in dotted lines in Fig. 2. The end-portions or arms 24 are preferably given the angular formation shown in Fig. 2, to adapt them to rest on the floor of the vehicle while the free or rail-supporting ends thereof are disposed upwardly so as to maintain the rail proper at an elevation above the floor of the automobile when the foot-rail is in normal position, shown in full lines in Fig. 2. The pivotal point 25 and the length of the end-portions or arms 24 are so correlated to the distance on the seat-back 16 from the pivotal point 18 to the robe-rail bracket 22, that the foot-rail 23, when swung upwardly into the position shown in dotted lines, will engage in the pockets or sockets formed rearward of the brackets 22 when the arm-portions of the brackets 22 when the front-seat back has been swung down into horizontal position. It is apparent that the foot-rail will provide a firm support throughout the entire length of the front-seat back when the latter has been lowered into the reclining position indicated in dotted lines.

Pivotally secured at 26 to the supporting member or frame-portion 14, which constitutes the frame for supporting the front end of the front-seat 20, and adapted to normally fold within the space or chambers beneath one or both of the front-seats, is a collapsible frame comprising the members or arms 27 and 28 which are preferably made U-shape, as shown in Fig. 1, where a pair is shown, in dotted lines located beneath each end of the seat and independently operable.

The frame members 27 and 28 are shown of different dimensions, namely with member 27 made slightly smaller than member 28, so as to permit the former to fold within the latter; and the two frame-members are secured together by a suitable fabric or flexible material, indicated at 29, which will maintain the frame-members or brackets 27 and 28 in the maximum separated relation at their outer ends, as shown in dotted lines in Fig. 2, when the mechanism has been swung upwardly out of the chamber about the pivotal point or rod 26 and spread or adjusted into the unfolded position indicated. The fabric 29 is stretched by the separation of the ends of the brackets and provides a supporting top. The ends of the frame or bracket members 27 and 28 are shown terminating in suitable hub-portions adapted to receive the rod or pivot-providing member 26 which may pass there through and be secured in the supporting member or framework which supports the seat. The frame-members 27 and 28 are of such length that their free ends and the connecting flexible material or fabric 29, when the mechanism is in "set-up" or unfolded position, will be disposed substantially in the same horizontal plane as the top of the front-seat 20, when the latter has been moved back into the position indicated in dotted lines and the back of the front-seat has been dropped down into its adjusted or reclining position. The folding frame-members 27 and 28 are pivoted at a point beneath the top of the seat supporting frame member 14, so as to limit and prevent the too far forward movement of the members 27 and 28; the member 28 being swung forward of the other as shown in Fig. 2 because of its additional length; the additional length and angularity of the member 28, enabling the top or fabric 29 to be disposed substantially parallel with the top of the cushion 20 when the correlated parts are all placed in couch-forming position and relation.

The panel 19 of the front seat back, at its upper end, is provided with a lug or strip, indicated at 30 in Fig. 2, which, when the seat is dropped down into the collapsed position shown in dotted lines, also provides an abutting stop for the seat 20, while the panel 19 provides suitable support for the rear side or edge of the seat 20. The construction enables the various parts to be brought into proper juxtaposition so as to provide a more or less continuous couch to comfortably support the body of the occupant.

In order to provide a suitable inclination for the entire couch formed by the adjusted relation of the various elements, the rear seat cushion may be placed in reverse position, namely with what may be termed the forward edge thereof in juxtaposition with the upholstered portion 10, as shown in dotted lines.

As is apparent from the construction shown and described, a couch is thus formed of suitable length which enables the occupant to lie in out-stretched position with his head on the rear seat 11, while the collapsible frame element composed of members 27, 28 and 29, constitutes a suitable rest for the feet.

In practice, the front seat-proper may comprise either one or two cushions 20, 20 and the space or chamber beneath each cushion may be provided with a separate collapsible foot-rest element, as shown in dotted lines in Fig. 1; the collapsible frame-members being sufficiently separated to provide adequate space for the steering gear, etc.

The seat-back 16 is locked in its upright or normal position by a suitable locking mechanism, as for example by a pair of similar spring-actuated plungers 31, one at each end of the seat-back; the plunger, as shown in Fig. 3, being arranged in suitable sockets formed at each end in the rear of the back 16 and provided with a finger-engaging portion 32; the plunger 31 being adapted to extend into a suitable socket-member or plate 33 secured to the sides 34 of the automobile body.

The invention herein described will provide a construction which will not necessitate such alterations as would affect the general appearance and rigidity of the seat construction, nor require any alteration in the main body portion; and the specific adaptation illustrated in the drawing may be modified, and applied to a different seat construction, without, however, departing from the spirit of my invention.

What I claim is:—

1. An automobile seat construction, comprising a front seat-back pivotally secured at its lower end to the sides of the automobile body so as to permit the back to swing downwardly, a pair of socketed brackets secured to the seat-back adjacent the upper end thereof, in combination with a pivotally secured foot-rail, adapted to engage in the sockets of said brackets and provide a support for the seat-back when the foot-rail has been swung upwardly and the seat-back swung into horizontal position.

2. An automobile seat construction, comprising a front seat-back pivotally secured at its lower end so as to swing downwardly, a pair of robe-rail socketed brackets secured adjacent the upper end of the seat-back, in combination with a pivoted foot-rail adapted to swing vertically, the foot-rail being provided with angularly formed end members, the length of the end members and the distance intermediate of the pivotal point of the seat-back and the sockets in the robe-rail brackets being correlated so that the foot-rail will enter the sockets of said brackets when the foot-rail has been swung vertically and the seat-back adjusted into horizontal position.

3. An automobile seat construction, comprising a front seat-back pivotally secured at its lower end to the sides of an automobile body so as to permit the back to swing downwardly, a pair of downwardly curved robe-rail brackets secured adjacent the upper end of the seat-back, in combination with a foot-rail mounted in a pair of angularly formed pivoted members adapted to permit the foot-rail to swing vertically, a portion of said pivoted members being adapted to rest on the automobile floor when the foot-rail is in normal position, the length of said foot-rail members and the distance between the pivotal point of the seat-back and said downwardly curved robe-rail brackets being so correlated that the foot-rail will engage with said downwardly curved robe-rail brackets when the seat-back has been adjusted into horizontal position and the foot-rail swung into vertical position.

4. An automobile seat construction, comprising a front seat-back pivotally secured at its lower end so as to swing downwardly, in combination with a removable seat-cushion, and collapsible means pivotally secured and foldable beneath said seat-cushion, said means being composed of frame-members pivotally secured together at one of their ends while the other ends of the members are secured together by yielding material.

5. An automobile seat construction, comprising a seat-back pivotally secured at its lower end so as to swing downwardly, the lower end of said back forward of said pivotal point, being provided with a panel disposed lengthwise of the seat-back, in combination with a removable seat-cushion adapted to rest on said panel when the seat-back is adjusted into horizontal position, and collapsible means pivotally secured and foldable beneath said cushion, said means comprising frame-members pivoted at one end while the other end is provided with yielding material adapted to permit said ends of the members to separate to a predetermined extent.

6. In an automobile seat construction, the combination of a front seat-back pivotally secured at its lower end so as to swing downwardly, a seat-supporting frame, a removable seat cushion, with a pair of frame members pivotally secured to the seat-supporting frame and beneath said cushion, said pair of members being adapted to swing vertically, and having the free ends united with flexible material.

7. In an automobile seat construction, the combination of a seat-supporting frame adapted to provide a chamber, a removable seat-cushion mounted on said frame, with a pair of nesting frame-members pivotally secured at their ends to the seat-supporting frame and beneath the cushion so as to swing vertically, and flexible material secured to the swinging ends of said pivotally secured frame-members.

8. In an automobile seat construction, the combination of a seat-supporting frame adapted to provide a chamber, a seat-cushion mounted on said frame, with a pair of nesting frame-members pivotally secured to said seat-supporting frame and beneath the cushion so as to adapt the nesting frame-members to swing vertically, yielding material secured to the swinging ends of the said nesting frame-members whereby the latter are maintained against movement beyond a predetermined separated relation, and means whereby said pivoted frame-members will be maintained in upright or vertical position.

9. In an automobile seat construction, the combination of a pivotally secured seat-back adapted to swing into a horizontal position, means secured adjacent the upper end of said seat-back, means pivotally secured adjacent to the floor of the automobile body and arranged to swing vertically, said last means being adapted to engage with the means on the seat-back when the latter has been moved into horizontal position, with members pivotally secured beneath the front-seat so as to swing vertically when said seat is removed, said members being adapted to extend substantially parallel with each other when in normal or folded position beneath the seat, while the outer or swinging ends of said members are secured together with flexible material adapted to permit the free ends of said members to spread apart to a predetermined extent and provide a supporting element.

10. An automobile seat construction, comprising a seat-back pivotally secured at its lower end so as to swing downwardly, robe-rail supporting means secured to the seat-back adjacent the upper end thereof, and a foot-rail pivotally secured so as to swing vertically, the robe-rail supporting means and said foot-rail being adapted to have interlocking relation when the seat-back has been swung downwardly.

11. An automobile seat construction, comprising a seat-back pivotally secured at its lower end so as to swing downwardly, the lower end of said seat-back being formed so as to provide a support for the seat-cushion when the seat-back has been swung downwardly into reclining position, in combination with a pivotally secured foot-rail adapted to swing vertically, and means secured to the seat-back adjacent the upper end thereof adapted to form interlocking relation with the foot-rail when the seat has been converted into couch form.

12. In an automobile seat construction, the combination of a convertible seat-back pivotally secured at its lower end so as to swing into reclining position, means adapted to support the upper end of said back from the automobile-door when the back is swung downwardly, with collapsible means pivotally mounted beneath the front-seat so as to swing upwardly, said means being provided with flexible material to adapt the means to move into distended position and to provide a supporting element.

SAMUEL C. PANDOLFO.

Witnesses:
EDWIN A. SCHULZ,
HELEN M. MINETTE.